W. N. AYERS, Jr.
PISTON.
APPLICATION FILED MAR. 15, 1915.
1,147,915.
Patented July 27, 1915.
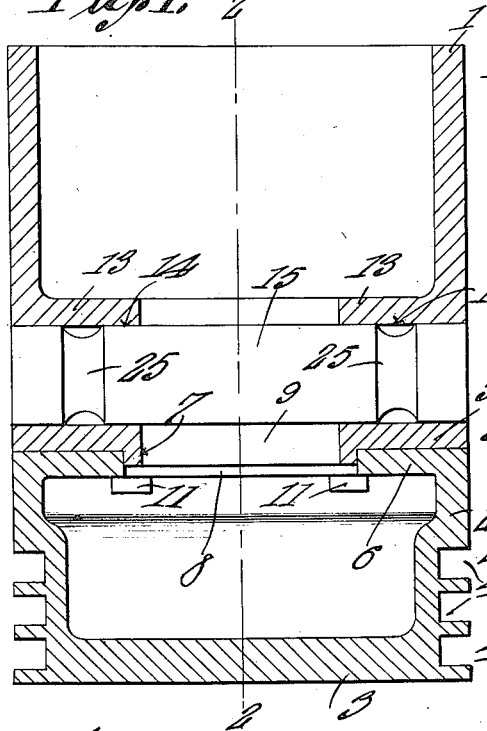
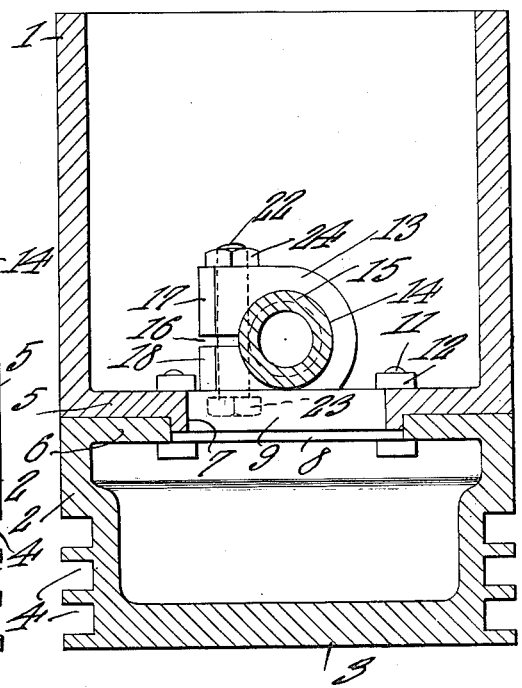
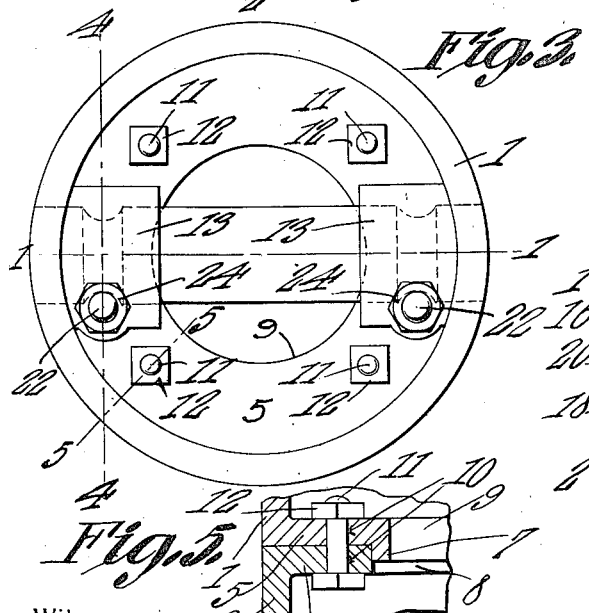
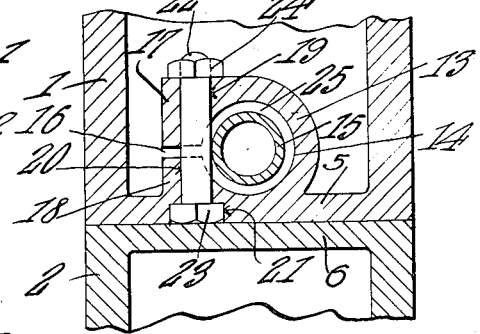
Witnesses
W. N. Ayers, Jr.
Inventor
by C. A. Snow & Co.
Attorneys

UNITED STATES PATENT OFFICE.

WILLIAM N. AYERS, JR., OF FORT SMITH, ARKANSAS.

PISTON.

1,147,915. Specification of Letters Patent. Patented July 27, 1915.

Application filed March 15, 1915. Serial No. 14,439.

*To all whom it may concern:*

Be it known that I, WILLIAM N. AYERS, Jr., a citizen of the United States, residing at Fort Smith, in the county of Sebastian and State of Arkansas, have invented a new and useful Piston, of which the following is a specification.

The present invention appertains to pistons, and aims to provide a novel and improved piston adapted especially for use in internal combustion engines, and adapted to be taken apart or separated whereby the piston end of the connecting rod may be adjusted to take up for wear.

It is the object of the invention to provide a piston embodying detachable sections, which are adapted to be separated at the joint between the wrist pin and connecting rod, and whereby the piston end of the connecting rod may be readily applied to and removed from the wrist pin, whereby the connecting rod may be adjusted to compensate for wear. In other words, the present invention contemplates the provision of a piston of such construction, that the piston end of the connecting rod may be of the same construction as the crank end of the connecting rod, whereby the piston end of the connecting rod may embody the brasses and clamp for holding the brasses against the wrist pin, so that the said clamp may be adjusted, from time to time, to take up wear between the wrist pin and brasses or bushing in the piston end of the connecting rod.

A further object of the invention is the provision of a piston embodying a unique assemblage of the parts thereof, and having novel means for holding the wrist pin.

It is also within the scope of the invention, to provide a piston having the features above noted, and which is comparatively simple and inexpensive in construction, as well as being convenient, practical, and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1 is a longitudinal section of the improved piston, taken on the line 1—1 of Fig. 3. Fig. 2 is a longitudinal section of the piston taken on the line 2—2 of Fig. 1. Fig. 3 is an end view of the piston. Fig. 4 is a sectional view taken on the line 4—4 of Fig. 3. Fig. 5 is a sectional detail taken on the line 5—5 of Fig. 3.

The present piston is composed of two sections or parts 1 and 2, or in other words, the piston is divided between its ends to provide the sections. The section 2 has the power end 3 which is adapted to receive the force of the expanding gases in the cylinder and the section 2 is also provided with annular grooves 4 for the reception of the usual packing rings. The adjacent ends of the sections 1 and 2 are provided with the coöperating inturned annular flanges 5 and 6, respectively, which fit snugly together, and the edge of the flange 5 is provided with an annular longitudinally projecting lip or rib 7 fitting snugly within the opening 8 formed by the flange 6. The flange 5 and its lip or rib 7 form an opening 9 alining or coöperating with the opening 8. The lip 7 in entering the opening 8 serves to aline or center the sections 1 and 2 relative to one another when they are assembled, and also prevents the sections being displaced laterally.

The sections 1 and 2 are secured together and to this end, the flanges 5 and 6 are provided with coöperating or alining apertures 10 through which bolts 11 are inserted, nuts 12 being threaded upon the bolts and preferably bearing against the flange 5, while the heads of the bolts 11 bear against the flange 6. Thus, the nuts 12 may be readily tightened and loosened through the hollow open ended section 1.

The section 1 is provided with diametrically opposite bosses 13 integral with the flange 5 and opposite walls of the section 1, so that the bosses 13 are arranged adjacent the joint between the sections 1 and 2. The bosses 13 are provided with apertures or bores 14 therethrough, extending radially relative to the piston, and disposed on a diametrical line. The bores 14 extend to the periphery of the section 1, for receiving the wrist pin 15.

The bosses 13 are split or divided at one side, as at 16, and are provided with lugs 17 and 18 adjacent the slits 16. The lugs 18 are integral with the flange 5, and the slits 16 extend to the walls of the section 1 from the inner or adjacent ends of the bosses. Thus, the bosses 13 form clamps adapted to tightly embrace the end portions of the wrist pin, and in order that the bosses or clamps 13 may be contracted, the lugs 17 are provided with apertures 19 therethrough, and the lugs 18 are provided with apertures 20 therethrough, the last mentioned apertures having sockets or recesses 21 at those ends remote from the lugs 17 or in the flange 5. Bolts 22 are passed through the apertures 19 and 20, and have heads 23 seated in the sockets or recesses 21, and nuts 24 are threaded upon the bolts and bear against the lugs 17, whereby when the nuts 24 are tightened, the lugs 17 will be moved toward the lugs 18 for contracting the bosses or clamps 13.

The bolts 22 are disposed tangentially relative to the bores or apertures 14 and project slightly thereinto, and the end portions of the wrist pin 15 are provided with annular grooves 25 receiving the bolts 22, whereby the bolts 22 will prevent the wrist pin 15 from moving transversely of the piston, or longitudinally of itself. In this manner, the bolts 22 serve the double function of causing the bosses or clamps 13 to pinch or embrace the wrist pin, and for holding the wrist pin against lateral displacement relative to the piston.

The present piston may be constructed in various sizes and proportions, and in its general construction resembles the ordinary piston, with the exception that the present piston is adapted to be separated whereby the piston end of the connecting rod may be readily applied to and detached from the piston, and adjusted for taking up wear. Thus, by detaching the sections 1 and 2, the piston end of the connecting rod is readily accessible, whereby the connecting rod may be readily assembled with or detached from the wrist pin, and whereby the piston end of the connecting rod may be in the form of a clamp containing brasses or a bushing and whereby the said clamp may be adjusted to compensate for wear. This is contrary to ordinary pistons, wherein the piston end of the connecting rod is simply journaled upon the wrist pin, and there is no means for taking up wear. It will also be noted, that an important feature of the invention resides in the provision of means for clamping the wrist pin in place, the clamping means being readily accessible, especially when the sections of the piston are separated. It is also to be noted that the connecting rod section 1 of the piston carries the means for holding the wrist pin, while the power section 2 is simply clamped or attached to the connecting rod section 1, and the detachment of the power section 2 from the connecting rod section 1 enables the connecting rod section, wrist pin and connecting rod to be readily assembled, separated, or adjusted. The power section 2 may be readily applied to the section 1, after the section 1, wrist pin and connecting rod are assembled.

From the foregoing, taken in connection with the drawing, it is believed that the advantages and capabilities of the invention will be obvious to those versed in the art, without further comment being necessary.

Having thus described the invention, what is claimed as new is:—

1. A piston divided between its ends to provide a pair of sections, said sections being detachably connected, one section having diametrically opposite wrist pin holding portions adjacent the joint between the sections.

2. A piston divided between its ends to provide power and connecting rod sections, said sections being detachably connected, the connecting rod section having diametrically opposite wrist pin holding portions adjacent the joint between the sections.

3. A piston divided between its ends to provide a pair of sections having inwardly projecting coöperating flanges, means for clamping the flanges together, and wrist pin holding means carried by one section adjacent the flanges.

4. A piston divided between its ends to provide a pair of sections having inwardly projecting coöperating flanges, means for clamping the flanges together, and wrist pin holding means carried by one section adjacent the flanges, one of the flanges having a portion projecting therefrom and fitting within the other flange for holding the sections against displacement.

5. A piston divided between its ends to provide a power and a connecting rod section, the sections having inturned coöperating flanges, means for clamping the flanges together, and the connecting rod section having wrist pin holding means adjacent the flanges.

6. A piston divided between its ends to provide a pair of sections, said sections being detachably connected, one section having diametrically opposite wrist pin clamps adjacent the joint between the sections.

7. A piston divided between its ends to provide a power and a connecting rod section, the sections being detachably connected, and the connecting rod section having diametrically opposite wrist pin clamps adjacent the joint between the sections.

8. A piston divided between its ends to provide a pair of sections having coöperating inturned flanges, means for clamping the flanges together, one section having diametrically opposite wrist pin clamps integral with its flange and opposite walls.

9. A piston divided between its ends to provide a power and a connecting rod section, the sections having coöperating inturned flanges, means for clamping the flanges together, and the connecting rod section having opposite wrist pin clamps integral with its flange and with its respective walls.

10. A piston comprising a pair of sections detachably connected, one section having opposite split clamps adjacent the joint between the sections, a wrist pin held by the clamps, and bolts engaging through the clamps for contracting them, the wrist pin having grooves receiving the bolts.

11. A piston comprising a power and a connecting rod section, the sections having coöperating inturned flanges, means for clamping the flanges together, the connecting rod section having opposite wrist pin clamps integral with opposite walls thereof and with its flange, the clamps being split and having lugs adjacent the split portion, one lug of each clamp being integral with the flange of the connecting rod section, and bolts engaged through the lugs of the respective clamps.

In testimony that I claim the foregoing as my own, I have hereto affixed my signature in the presence of two witnesses.

WILLIAM N. AYERS, Jr.

Witnesses:
H. G. ALTMILLER,
H. A. McDONALD.